United States Patent
Ding et al.

(10) Patent No.: US 11,216,593 B2
(45) Date of Patent: Jan. 4, 2022

(54) DATA PROTECTION CIRCUIT OF CHIP, CHIP, AND ELECTRONIC DEVICE

(71) Applicant: Huawei Technologies Co., Ltd., Shenzhen (CN)

(72) Inventors: Qiang Ding, Xi'an (CN); Yu Liu, Shanghai (CN); Jiayin Lu, Xi'an (CN); ZhuFeng Tan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/411,230

(22) Filed: May 14, 2019

(65) Prior Publication Data

US 2019/0266358 A1  Aug. 29, 2019

Related U.S. Application Data

(63) Continuation of application No. PCT/CN2017/093567, filed on Jul. 19, 2017.

(30) Foreign Application Priority Data

Nov. 14, 2016  (CN) .......................... 201610999875.6

(51) Int. Cl.
*G06F 21/72* (2013.01)
*G06F 21/60* (2013.01)
(Continued)

(52) U.S. Cl.
CPC .............. *G06F 21/72* (2013.01); *G06F 11/10* (2013.01); *G06F 21/60* (2013.01); *G06F 21/602* (2013.01); *G06F 21/75* (2013.01); *G06F 21/78* (2013.01)

(58) Field of Classification Search
CPC .......... G06F 21/72; G06F 11/10; G06F 21/60; G06F 21/602; G06F 21/75; G06F 21/78
See application file for complete search history.

(56) References Cited

U.S. PATENT DOCUMENTS 5,826,007 A  10/1998 Sakaki et al.
5,943,257 A  8/1999 Jeon et al.
(Continued)

FOREIGN PATENT DOCUMENTS

CN  2492652 Y  5/2002
CN  101978339 B  10/2013
(Continued)

OTHER PUBLICATIONS

Machine Translation and Abstract of Chinese Publication No. CN103903648, Jul. 2, 2014, 10 pages.
(Continued)

*Primary Examiner* — Trang T Doan
*Assistant Examiner* — Vladimir I Gavrilenko
(74) *Attorney, Agent, or Firm* — Conley Rose, P.C.

(57) ABSTRACT

A data protection circuit of a chip, a chip, and an electronic device, where the data protection circuit performs bit width expansion and scrambling processing on a first alarm signal using an operation circuit to obtain a second alarm signal, and outputs the second alarm signal to a processing circuit. The processing circuit performs descrambling processing after receiving the second alarm signal to obtain a descrambling result. When the second alarm signal is attacked, the descrambling fails, and the descrambling result is an active level. The processing circuit outputs the descrambling result to a reset request circuit, and the reset request circuit generates a reset request signal according to the descrambling result.

20 Claims, 9 Drawing Sheets

(51) Int. Cl.
  *G06F 11/10* (2006.01)
  *G06F 21/78* (2013.01)
  *G06F 21/75* (2013.01)

(56) References Cited

U.S. PATENT DOCUMENTS

| | | | |
|---|---|---|---|
| 6,442,525 B1* | 8/2002 | Silverbrook | B41J 2/14 |
| | | | 705/50 |
| 8,582,388 B1 | 11/2013 | Hu et al. | |
| 8,583,263 B2* | 11/2013 | Hoffberg | G05B 15/02 |
| | | | 700/17 |
| 9,432,298 B1* | 8/2016 | Smith | H04L 49/9057 |
| 10,374,593 B2* | 8/2019 | Taoka | H03K 3/011 |
| 2003/0222782 A1* | 12/2003 | Gaudreau | G08B 21/082 |
| | | | 340/573.6 |
| 2005/0078016 A1* | 4/2005 | Neff | H04L 25/4906 |
| | | | 341/50 |
| 2007/0150756 A1 | 6/2007 | Kudelski | |
| 2007/0217608 A1 | 9/2007 | Shimasaki | |
| 2009/0102643 A1 | 4/2009 | Haid | |
| 2009/0205050 A1 | 8/2009 | Giordano et al. | |
| 2009/0300312 A1* | 12/2009 | Handschuh | G06F 12/1408 |
| | | | 711/166 |
| 2011/0138261 A1 | 6/2011 | Bains et al. | |
| 2015/0010151 A1* | 1/2015 | Roelse | H04N 21/8166 |
| | | | 380/210 |
| 2018/0234147 A1* | 8/2018 | Lee | H04B 7/0626 |
| 2019/0012472 A1 | 1/2019 | Hu et al. | |
| 2019/0205244 A1* | 7/2019 | Smith | G06F 12/0866 |

FOREIGN PATENT DOCUMENTS

| | | |
|---|---|---|
| CN | 103903648 A | 7/2014 |
| CN | 103927492 A | 7/2014 |
| CN | 104268030 A | 1/2015 |
| CN | 105224425 A | 1/2016 |
| CN | 105391542 A | 3/2016 |
| CN | 105574419 A | 5/2016 |
| CN | 105790927 A | 7/2016 |
| TW | 397981 B | 7/2000 |
| TW | 464804 B | 11/2001 |
| TW | M419198 U | 12/2011 |
| TW | 201351429 A | 12/2013 |

OTHER PUBLICATIONS

Machine Translation and Abstract of Chinese Publication No. CN103927492, Jul. 16, 2014, 14 pages.
Machine Translation and Abstract of Chinese Publication No. CN105224425, Jan. 6, 2016, 12 pages.
Foreign Communication From a Counterpart Application, Taiwanese Application No. 10720536310, Taiwanese Office Action dated Jun. 15, 2018, 3 pages.
Foreign Communication From a Counterpart Application, PCT Application No. PCT/CN2017/093567, English Translation of International Search Report dated Oct. 17, 2017, 2 pages.
Foreign Communication From a Counterpart Application, PCT Application No. PCT/CN2017/093567, English Translation of Written Opinion dated Oct. 17, 2017, 3 pages.

* cited by examiner

DATA PROTECTION CIRCUIT OF CHIP, CHIP, AND ELECTRONIC DEVICE

CROSS-REFERENCE TO RELATED APPLICATIONS

This application is a continuation of International Patent Application No. PCT/CN2017/093567 filed on Jul. 19, 2017, which claims priority to Chinese Patent Application No. 201610999875.6 filed on Nov. 14, 2016. The disclosures of the aforementioned applications are hereby incorporated by reference in their entireties.

TECHNICAL FIELD

This application relates to chip technologies, and in particular, to a data protection circuit of a chip, a chip, and an electronic device.

BACKGROUND

A chip is an important component of a mobile terminal, a computer, or another electronic device, and is responsible for functions such as calculation and storage. The chip generates data and stores the data in an operating state, and a part or all of the data requires high confidentiality. For example, data that is generated and stored by a security chip in an operating state. Therefore, it is particularly important to prevent data of a chip from being stolen.

In other approaches, a chip includes an operation module and a clock reset module, and the operation module is connected to the clock reset module. When subjected to an external attack, the operation module generates an alarm signal of an active level, and the clock reset module generates a reset request signal of an active level according to the alarm signal, and triggers resetting of the chip such that the chip is restored to an initialization state in order to prevent data of the chip from being stolen.

However, when the alarm signal is attacked, the chip cannot be reset. Therefore, security of a chip in the other approaches is not high.

SUMMARY

This application provides a data protection circuit of a chip, a chip, and an electronic device, to resolve a problem that chip security is not high.

An aspect of this application provides a data protection circuit of a chip, and the circuit includes an operation module, an alarm management module, and a reset module, the alarm management module includes a processing unit and a reset request unit, and the processing unit is connected to the operation module. After generating a first alarm signal, the operation module performs bit width expansion and scrambling processing on the first alarm signal to obtain a second alarm signal, and the operation module sends a second alarm signal to the processing unit. The processing unit performs descrambling processing on the second alarm signal to obtain a descrambling result, and outputs the descrambling result to the reset request unit. The reset request unit generates a reset request signal according to the descrambling result, and sends the reset request signal to the reset module. The reset module determines, according to the reset request signal, whether to reset some or all operation modules of the chip.

When the operation module detects an attack signal, the first alarm signal is an active level, or when the operation module detects no attack signal, the first alarm signal is an inactive level, when descrambling performed by the processing unit succeeds, if the first alarm signal is an active level, the descrambling result is an active level, or if the first alarm signal is an inactive level, the descrambling result is an inactive level, or when descrambling performed by the processing unit fails, the descrambling result is an active level, and when the descrambling result is an active level, the reset request signal is an active level, or when the descrambling result is an inactive level, the reset request signal is an inactive level.

The data protection circuit of the chip performs bit width expansion and scrambling processing on the first alarm signal using the operation module to obtain the second alarm signal, and outputs the second alarm signal to the processing unit. The processing unit performs descrambling processing after receiving the second alarm signal to obtain the descrambling result. When the second alarm signal is attacked, the descrambling fails, and the descrambling result is an active level. The processing unit outputs the descrambling result to the reset request unit, and the reset request unit generates the reset request signal according to the descrambling result. Therefore, even if the second alarm signal is attacked, the reset request unit can output the reset request signal, to protect data of the operation module from being stolen in order to improve chip security.

In a possible design, the processing unit includes a first descrambling processing subunit, a first delay processing subunit, a second delay processing subunit, a second descrambling processing subunit, a comparator, and a first OR gate unit.

An input end of the first descrambling processing subunit is connected to an output end of the operation module, an output end of the first descrambling processing subunit is connected to an input end of the first delay processing subunit, and an output end of the first delay processing subunit is connected to a first input end of the comparator.

An input end of the second delay processing subunit is connected to the output end of the operation module, an output end of the second delay processing subunit is connected to an input end of the second descrambling processing subunit, and an output end of the second descrambling processing subunit is connected to a second input end of the comparator.

The output end of the second descrambling processing subunit is further connected to a first input end of the first OR gate unit, an output end of the comparator is connected to a second input end of the first OR gate unit, and an output end of the first OR gate unit is configured to output the descrambling result.

Both the first descrambling processing subunit and the second descrambling processing subunit are configured to perform descrambling processing.

Both the first delay processing subunit and the second delay processing subunit are configured to perform delay processing.

When descrambling performed by the first descrambling processing subunit succeeds, if the first alarm signal is an active level, the output end of the first descrambling processing subunit outputs an active level, or if the first alarm signal is an inactive level, the output end of the first descrambling processing subunit outputs an inactive level, or when descrambling performed by the first descrambling processing subunit fails, the output end of the first descrambling processing subunit outputs an active level.

When descrambling performed by the second descrambling processing subunit succeeds, if the first alarm signal is an active level, the output end of the second descrambling processing subunit outputs an active level, or if the first alarm signal is an inactive level, the output end of the second descrambling processing subunit outputs an inactive level, or when descrambling performed by the second descrambling processing subunit fails, the output end of the second descrambling processing subunit outputs an active level.

In a possible design, the processing unit includes a first descrambling processing subunit, a first delay processing subunit, a second delay processing subunit, a second descrambling processing subunit, a comparator, and a first OR gate unit.

An input end of the first descrambling processing subunit is connected to an output end of the operation module, an output end of the first descrambling processing subunit is connected to an input end of the first delay processing subunit, and an output end of the first delay processing subunit is connected to a first input end of the comparator.

An input end of the second delay processing subunit is connected to the output end of the operation module, an output end of the second delay processing subunit is connected to an input end of the second descrambling processing subunit, and an output end of the second descrambling processing subunit is connected to a second input end of the comparator.

The output end of the first delay processing subunit is further connected to a first input end of the first OR gate unit, an output end of the comparator is connected to a second input end of the first OR gate unit, and an output end of the first OR gate unit is configured to output the descrambling result.

Both the first descrambling processing subunit and the second descrambling processing subunit are configured to perform descrambling processing.

Both the first delay processing subunit and the second delay processing subunit are configured to perform delay processing.

When descrambling performed by the first descrambling processing subunit succeeds, if the first alarm signal is an active level, the output end of the first descrambling processing subunit outputs an active level, or if the first alarm signal is an inactive level, the output end of the first descrambling processing subunit outputs an inactive level, or when descrambling performed by the first descrambling processing subunit fails, the output end of the first descrambling processing subunit outputs an active level.

When descrambling performed by the second descrambling processing subunit succeeds, if the first alarm signal is an active level, the output end of the second descrambling processing subunit outputs an active level, or if the first alarm signal is an inactive level, the output end of the second descrambling processing subunit outputs an inactive level, or when descrambling performed by the second descrambling processing subunit fails, the output end of the second descrambling processing subunit outputs an active level.

In a possible design, the processing unit includes a descrambling module.

An input end of the descrambling module is connected to an output end of the operation module, an output end of the descrambling module is connected to an input end of the reset request unit, and the descrambling module is configured to receive the second alarm signal, and perform descrambling processing on the second alarm signal to obtain the descrambling result.

When descrambling performed by the descrambling module succeeds, if the first alarm signal is an active level, the descrambling result is an active level, or if the first alarm signal is an inactive level, the descrambling result is an inactive level, or when descrambling performed by the descrambling module fails, the descrambling result is an active level.

In a possible design, the reset request unit is a first AND gate unit, a first input end of the first AND gate unit is connected to the output end of the first OR gate unit, a second input end of the first AND gate unit is configured to input an alarm enable signal, and an output end of the first AND gate unit is configured to output the reset request signal.

In the two possible designs, the first OR gate unit is disposed, and when an active level that is output by the output end of the comparator is attacked, or when an active level that is input by the second descrambling processing subunit to the second input end of the first OR gate unit is attacked, the output end of the first OR gate unit outputs an active level. Therefore, when the first alarm signal is a high level, regardless of whether the second alarm signal is attacked, the descrambling result that is output by the first OR gate unit is an active level. Therefore, the first OR gate unit can successfully transmit an alarm signal to the reset request unit. When the descrambling result received by the reset request unit is an active level, the generated reset request signal is an active level. When the received reset request signal is an active level, the reset module performs reset processing on the some or all operation modules of the chip. Therefore, data of the operation module is protected from being stolen, and chip security is improved.

In a possible design, the alarm enable signal is controlled by a register, and the register is configured by software. When the alarm enable signal is attacked, a second alarm enable signal may be an active level by modifying the register.

In a possible design, the alarm enable signal is controlled by a one-time programmable device.

In a possible design, the circuit further includes a second OR gate unit, where an output end of the second OR gate unit is configured to output the alarm enable signal, a first input end of the second OR gate unit is configured to input a first alarm enable signal, a second input end of the second OR gate unit is configured to input a second alarm enable signal, the first alarm enable signal is controlled by a one-time programmable device, the second alarm enable signal is controlled by a register, and the register is configured by software.

The reset request unit is implemented using the first AND gate unit. The alarm enable signal is used as input of the first AND gate unit. When both the alarm enable signal and the descrambling result are active levels, the reset request signal that is output by the output end of the first AND gate unit is an active level. In a scenario of testing a chip or another scenario in which reset of a chip is not allowed, the alarm enable signal may be set to an inactive signal in order to ensure normal use of a chip in the testing scenario or another scenario.

In a possible design, the circuit further includes a second AND gate unit, where a first input end of the second AND gate unit is configured to input an alarm interruption enable signal, a second input end of the second AND gate unit is connected to the output end of the first OR gate unit, an output end of the second AND gate unit is configured to input an interruption signal to a central processing unit (CPU), and the interruption signal is configured to trigger the CPU to execute an alarm processing program.

In a possible design, a scrambling processing manner includes any one of cyclic redundancy check (CRC), parity check, or encryption.

In a possible design, the one-time programmable device is an electrical fuse (Efuse).

In a possible design, the active level is a high level, and the inactive level is a low level.

Another aspect of this application provides a chip, including the data protection circuit according to any one of the foregoing aspect or possible designs in the foregoing aspect.

Still another aspect of this application provides an electronic device, including the chip according to the foregoing aspect.

DESCRIPTION OF EMBODIMENTS

Specific embodiments are used below to describe in detail the technical solutions of the present disclosure. The following several specific embodiments may be combined with each other, and a same or similar concept or process may not be described repeatedly in some embodiments.

An active level described in the following embodiments may be represented by a high level, and correspondingly, an inactive level is represented by a low level. An active level may also be represented by a low level, and correspondingly, an inactive level is represented by a high level. This application imposes no limitation herein.

A chip includes multiple operation modules, and the following embodiments are described using an example in which one operation module is attacked.

Figure 1:
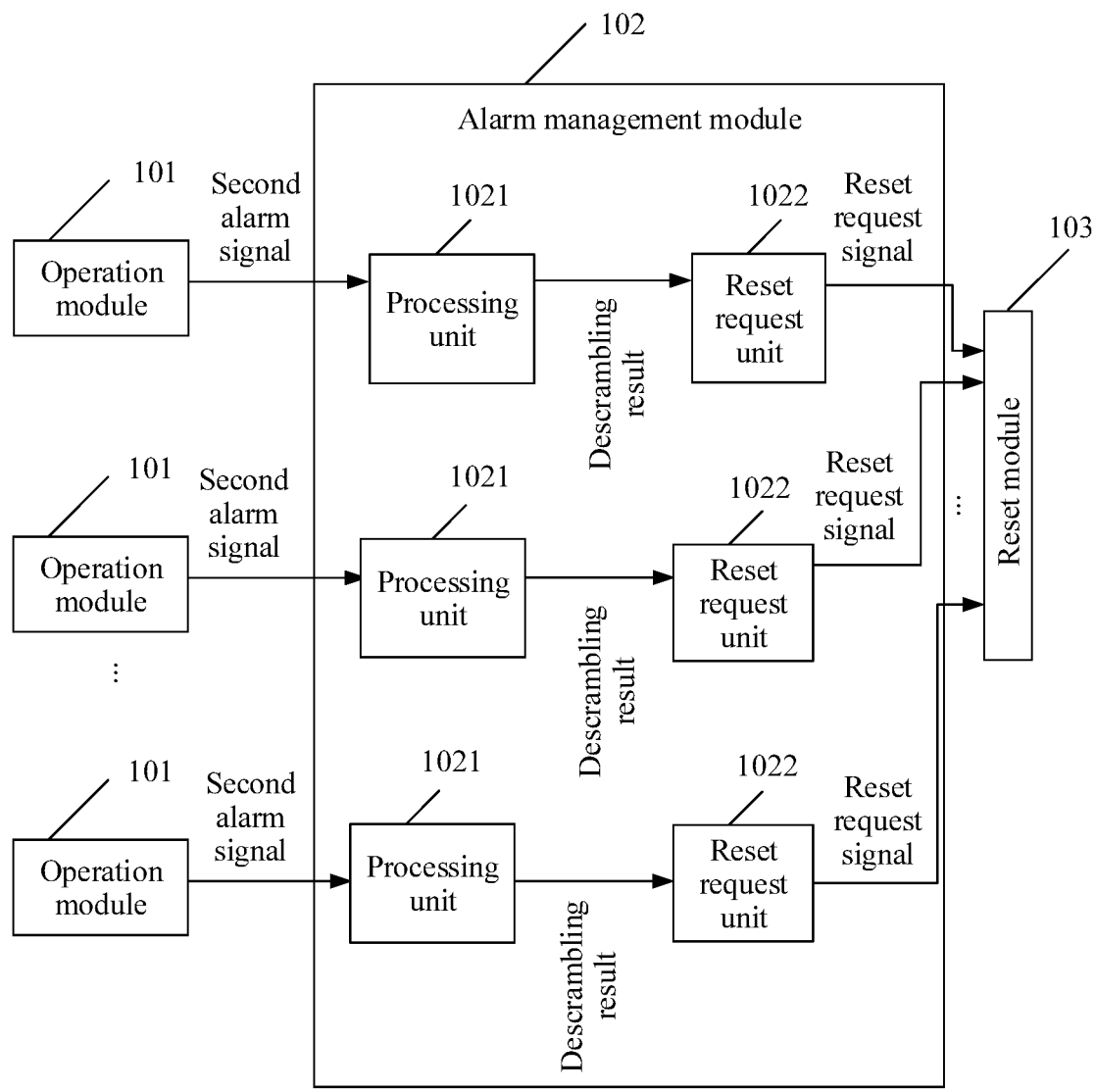
FIG. 1 is a schematic structural diagram of a data protection circuit of a chip according to Embodiment 1 of this application.

FIG. 1 is a schematic structural diagram of a data protection circuit of a chip according to Embodiment 1 of this application. As shown in FIG. 1, in the embodiment of the data protection circuit shown in FIG. 1, the data protection circuit includes an operation module 101, an alarm management module 102, and a reset module 103. The alarm management module 102 includes a processing unit 1021 and a reset request unit 1022. The operation module 101 is connected to the processing unit 1021 of the alarm management module 102, the processing unit 1021 is connected to the reset request unit 1022, and the reset request unit 1022 is connected to the reset module 103.

The operation module generates a first alarm signal according to whether an attack signal is detected. When the operation module is attacked, the operation module detects the attack signal, and the generated first alarm signal is an active level. When the operation module detects no attack signal, the generated first alarm signal is an inactive level. After generating the first alarm signal, the operation module performs bit width expansion on the first alarm signal, that is, a single-bit (bit) signal is expanded to a multi-bit (such as, 4 bits, 16 bits, or 32 bits) signal, and performs scrambling processing on the multi-bit signal to obtain a second alarm signal. A scrambling processing manner includes but is not limited to a CRC manner, a parity check manner, and an encryption manner.

The operation module outputs the second alarm signal to the processing unit, and the processing unit performs descrambling processing after receiving the second alarm signal to obtain a descrambling result. Further, when descrambling performed by the processing unit succeeds, the descrambling result is consistent with the first alarm signal. For example, the first alarm signal is an active level, and the descrambling result is an active level, or the first alarm signal is an inactive level, and the descrambling result is an inactive level. When descrambling performed by the processing unit fails, the descrambling result is an active level, that is, that the descrambling fails indicates that the second alarm signal is attacked in a transmission process, and the descrambling result is an active level regardless of whether the first alarm signal is an active level or an inactive level.

The processing unit obtains the descrambling result, and outputs the descrambling result to the reset request unit. The reset request unit generates a reset request signal according to the descrambling result, and sends the reset request signal to the reset module. Further, the reset request signal generated by the reset request unit is consistent with the descrambling result, that is, when the descrambling result is an active level, the reset request signal is an active level, or when the descrambling result is an inactive level, the reset request signal is an inactive level.

The reset module determines, according to the reset request signal, whether to reset some or all operation modules of the chip. When the reset request signal is an active level, the reset module resets the some or all operation modules, or when the reset request signal is an inactive level, the reset module does not perform reset.

With reference to the description in Embodiment 1, when the operation module is attacked, the first alarm signal generated by the operation module is an active level, and the operation module sends the second alarm signal to the processing unit. If descrambling succeeds, the descrambling result is consistent with the first alarm signal, that is, the descrambling result is an active level. If descrambling fails, it indicates that the second alarm signal is attacked, and the descrambling result is an active level. Therefore, when the first alarm signal is an active level, regardless of whether the first alarm signal is attacked, the descrambling result that is output by the processing unit to the reset request unit is an active level such that the processing unit can successfully transmit an alarm signal to the reset request unit. When the descrambling result received by the reset request unit is an active level, the generated reset request signal is an active level. When the received reset request signal is an active level, the reset module performs reset processing on the some or all operation modules of the chip. Therefore, data of the operation module is protected from being stolen, and chip security is improved.

In this embodiment, the operation module performs bit width expansion and scrambling processing on the first alarm signal to obtain the second alarm signal, and outputs the second alarm signal to the processing unit. The processing unit performs descrambling processing after receiving the second alarm signal to obtain the descrambling result. When the second alarm signal is attacked, the descrambling fails, and the descrambling result is an active level. The processing unit outputs the descrambling result to the reset request unit, and the reset request unit generates the reset request signal according to the descrambling result. Therefore, even if the second alarm signal is attacked, the reset request unit can output the reset request signal to protect data of the operation module from being stolen in order to improve chip security.

Figure 2:
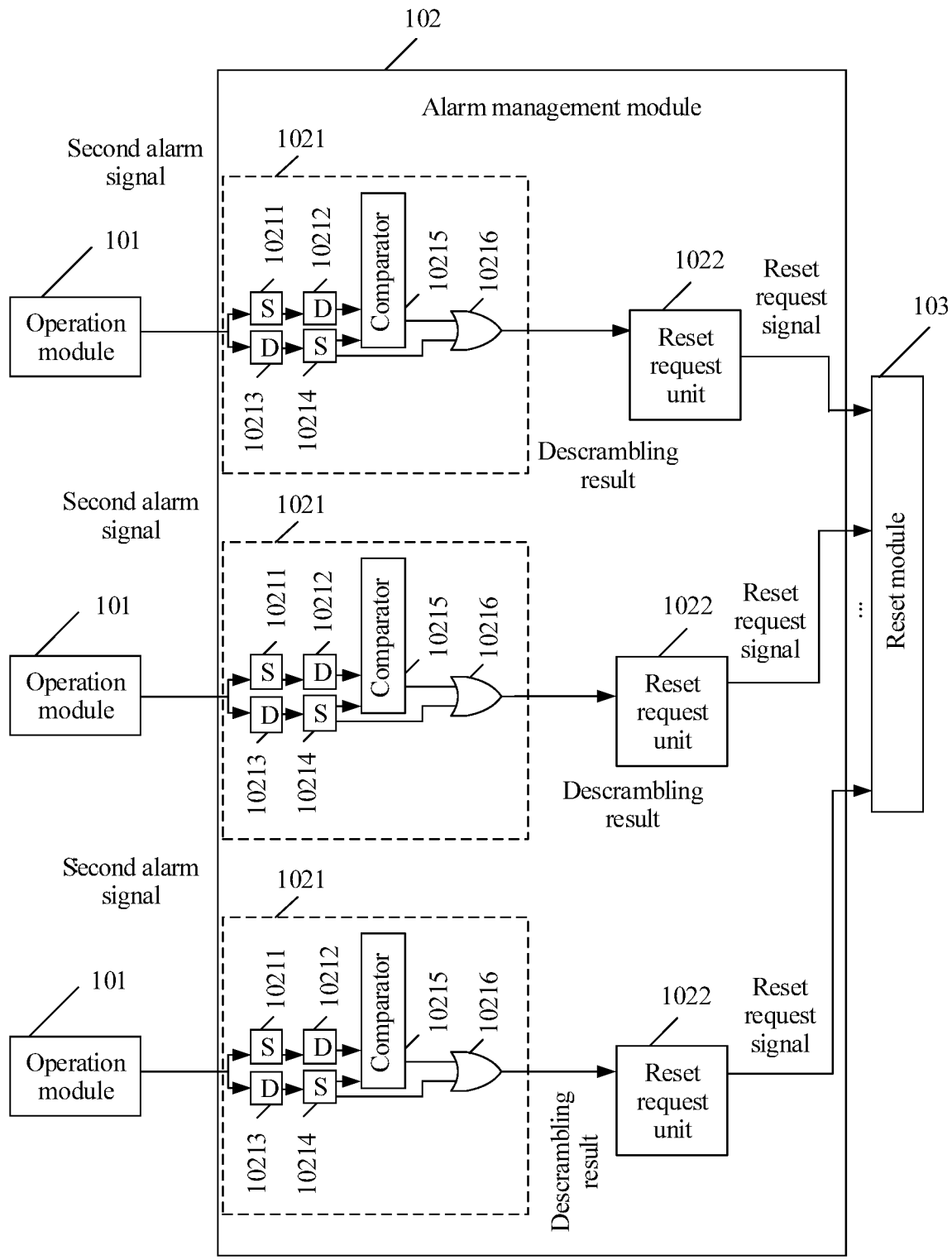
FIG. 2 is a schematic structural diagram of a data protection circuit of a chip according to Embodiment 2 of this application.

FIG. 2 is a schematic structural diagram of a data protection circuit of a chip according to Embodiment 2 of this application. Embodiment 2 describes a possible implementation of the processing unit 1021 based on Embodiment 1. As shown in FIG. 2, the processing unit 1021 includes a first descrambling processing subunit 10211, a first delay processing subunit 10212, a second delay processing subunit 10213, a second descrambling processing subunit 10214, a comparator 10215, and a first OR gate unit 10216. The first descrambling processing subunit and the second descrambling processing subunit in the following embodiments are represented by "S", and the first delay processing subunit and the second delay processing subunit are represented by "D".

The processing unit includes two signal processing paths, in one path, descrambling processing is performed before delay processing, and in the other path, delay processing is performed before descrambling processing. That is, in the two signal processing paths, a time point to perform descrambling processing is different from a time point to perform delay processing. Delay processing is performed at different time points such that signals transmitted on the two signal processing paths are different at a same time point in a time domain. Therefore, a result in which signals on the two signal processing paths are the same after being attacked at the same time point is avoided such that when signals on the two signal processing paths are attacked simultaneously, an output result of the comparator is an active level. Details are shown in the following.

One signal processing path includes the first descrambling processing subunit 10211 and the first delay processing subunit 10212. An input end of the first descrambling processing subunit 10211 is connected to an output end of the operation module 101. An output end of the first descrambling processing subunit 10211 is connected to an input end of the first delay processing subunit 10212. An output end of the first delay processing subunit 10212 is connected to a first input end of the comparator 10215.

The other signal processing path includes the second delay processing subunit 10213 and the second descrambling processing subunit 10214. An input end of the second delay processing subunit 10213 is connected to the output end of the operation module 101, an output end of the second delay processing subunit 10213 is connected to an input end of the second descrambling processing subunit 10214, and an output end of the second descrambling processing subunit 10214 is connected to a second input end of the comparator 10215.

The output end of the second descrambling processing subunit 10214 is further connected to a first input end of the first OR gate unit 10216, an output end of the comparator 10215 is connected to a second input end of the first OR gate unit 10216, and an output end of the first OR gate unit 10216 is configured to output a descrambling result.

When input of the first input end is the same as input of the second input end of the comparator, output of the output end of the comparator is consistent with the input of the input end of the comparator. That is, when each of the first input end and the second input end inputs an active level, the output end of the comparator outputs an active level, or when each of the first input end and the second input end inputs an inactive level, the output end of the comparator outputs an inactive level. When the input of the first input end is different from the input of the second input end of the comparator, the output end of the comparator outputs an active level.

Both the first descrambling processing subunit and the second descrambling processing subunit are configured to perform descrambling processing. Both the first delay processing subunit and the second delay processing subunit are configured to perform delay processing.

When descrambling performed by the first descrambling processing subunit succeeds, a result that is output by the output end of the first descrambling processing subunit is consistent with the first alarm signal. For example, the first alarm signal is an active level, and the output end of the first descrambling processing subunit outputs an active level, or the first alarm signal is an inactive level, and the output end of the first descrambling processing subunit outputs an inactive level. When descrambling performed by the first descrambling processing subunit fails, the output end of the first descrambling processing subunit outputs an active level, that is, that the descrambling performed by the first descrambling processing subunit fails indicates that the second alarm signal is attacked. Therefore, when the descrambling fails, the first descrambling processing subunit outputs an active level.

When descrambling performed by the second descrambling processing subunit succeeds, a result that is output by the output end of the second descrambling processing subunit is consistent with the first alarm signal. For example, the first alarm signal is an active level, and the output end of the second descrambling processing subunit outputs an active level, or the first alarm signal is an inactive level, and the output end of the second descrambling processing subunit outputs an inactive level. When descrambling performed by the second descrambling processing subunit fails, the output end of the second descrambling processing subunit outputs an active level, that is, that the descrambling performed by the second descrambling processing subunit fails indicates that the second alarm signal is attacked. Therefore, when the descrambling fails, the second descrambling processing subunit outputs an active level.

With reference to FIG. 2 and the description in Embodiment 2, when the operation module is attacked, the first alarm signal generated by the operation module is an active level, and the output end of the operation module outputs the second alarm signal to the two signal processing paths.

There are the following cases.

A case of a path for performing descrambling processing before delay processing is as follows.

(1) When the second alarm signal is attacked, the descrambling performed by the first descrambling processing subunit fails, and an active level is output. When the first delay processing subunit is attacked, the first delay processing subunit outputs an inactive level to the first input end of the comparator.

(2) When the second alarm signal is attacked, the descrambling performed by the first descrambling processing subunit fails, and an active level is output. When the first delay processing subunit is not attacked, the first delay processing subunit outputs an active level to the first input end of the comparator.

(3) When the second alarm signal is not attacked, the descrambling performed by the first descrambling processing subunit succeeds, and an active level is output. When the first delay processing subunit is attacked, the first delay processing subunit outputs an inactive level to the first input end of the comparator.

(4) When the second alarm signal is not attacked, the descrambling performed by the first descrambling processing subunit succeeds, and an active level is output. When the first delay processing subunit is not attacked, the first delay processing subunit outputs an active level to the first input end of the comparator.

A case of a path for performing delay processing before descrambling processing is as follows.

(1) When the second alarm signal is attacked or the second delay processing subunit is attacked, the second descrambling processing subunit outputs an active level to the second input end of the comparator. In addition, the second descrambling processing subunit inputs an active level to the second input end of the first OR gate unit.

(2) When the second alarm signal is not attacked or the second delay processing subunit is not attacked, the second descrambling processing subunit outputs an active level to the second input end of the comparator. In addition, the second descrambling processing subunit inputs an active level to the second input end of the first OR gate unit.

With reference to combinations of various cases of the two signal processing paths, it may be learned that when the first alarm signal is an active level, the output end of the comparator outputs an active level. Because the output end of the comparator is connected to the first input end of the first OR gate unit, the first input end of the first OR gate unit inputs an active level.

With reference to the cases of the path for performing delay processing before descrambling processing, when the first alarm signal is an active level, the output end of the second descrambling processing subunit inputs an active level to the second input end of the first OR gate unit.

The first OR gate unit is disposed, and when an active level that is output by the output end of the comparator is attacked, or when an active level that is input by the second descrambling processing subunit to the second input end of the first OR gate unit is attacked, the output end of the first OR gate unit outputs an active level. Therefore, when the first alarm signal is a high level, regardless of whether the second alarm signal is attacked, the descrambling result that is output by the first OR gate unit is an active level. Therefore, the first OR gate unit can successfully transmit an alarm signal to the reset request unit. When the descrambling result received by the reset request unit is an active level, the generated reset request signal is an active level. When the received reset request signal is an active level, the reset module performs reset processing on the some or all operation modules of the chip. Therefore, data of the operation module is protected from being stolen, and chip security is improved.

Figure 3:
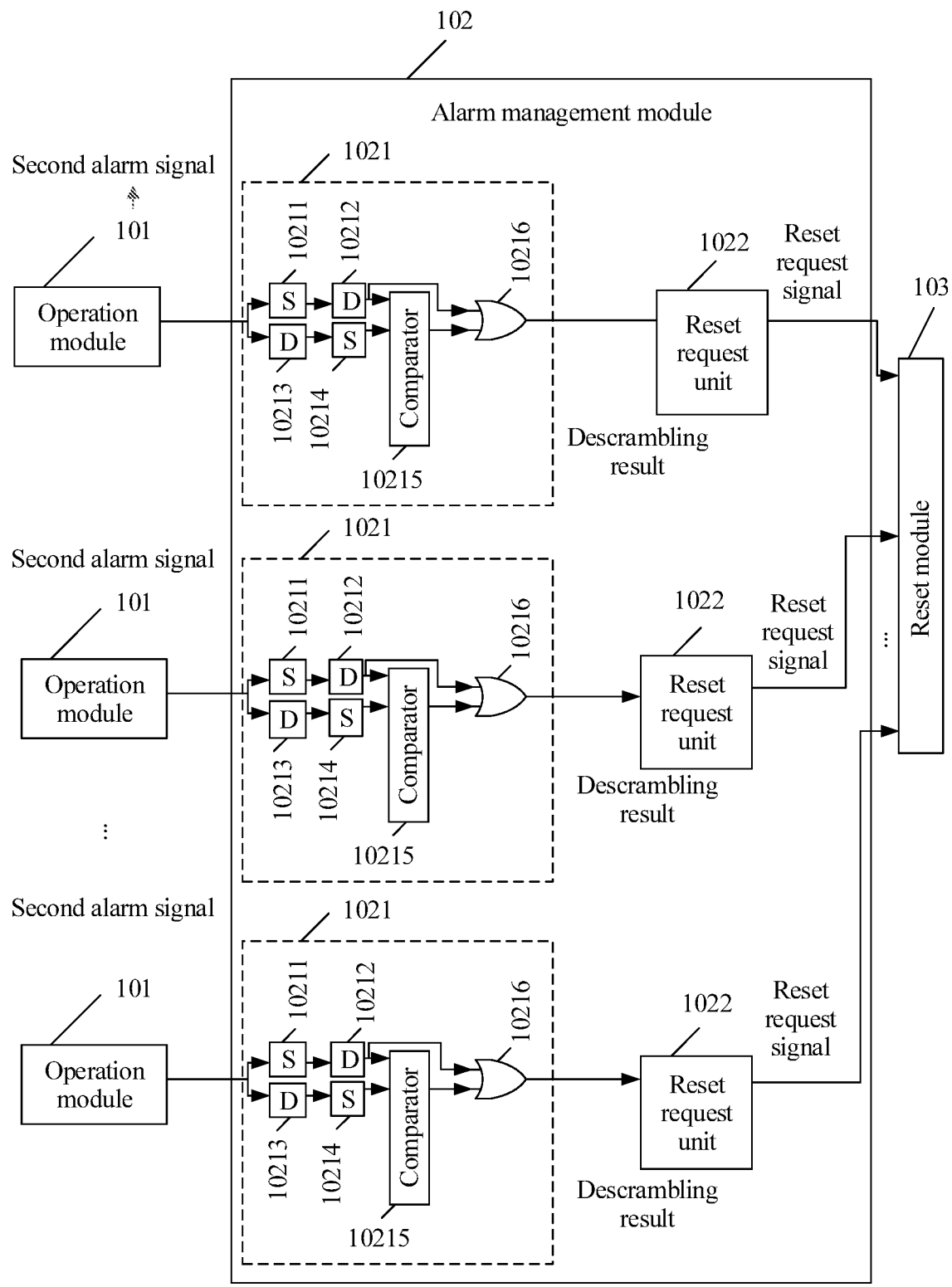
FIG. 3 is a schematic structural diagram of a data protection circuit of a chip according to Embodiment 3 of this application.

FIG. 3 is a schematic structural diagram of a data protection circuit of a chip according to Embodiment 3 of this application. FIG. 3 describes another possible implementation of the processing unit 1021 based on the embodiment shown in FIG. 1. Differences between FIG. 3 and FIG. 2 lie in that, in FIG. 2, the output end of the second descrambling processing subunit 10214 is connected to the first input end of the first OR gate unit 10216, but in FIG. 3, an output end of a first delay processing subunit 10212 is connected to a first input end of a first OR gate unit 10216. Details are shown in FIG. 3. Implementation principles and technical effects in FIG. 3 are similar to those in the embodiment shown in FIG. 2, and details are not described herein again.

Figure 4:
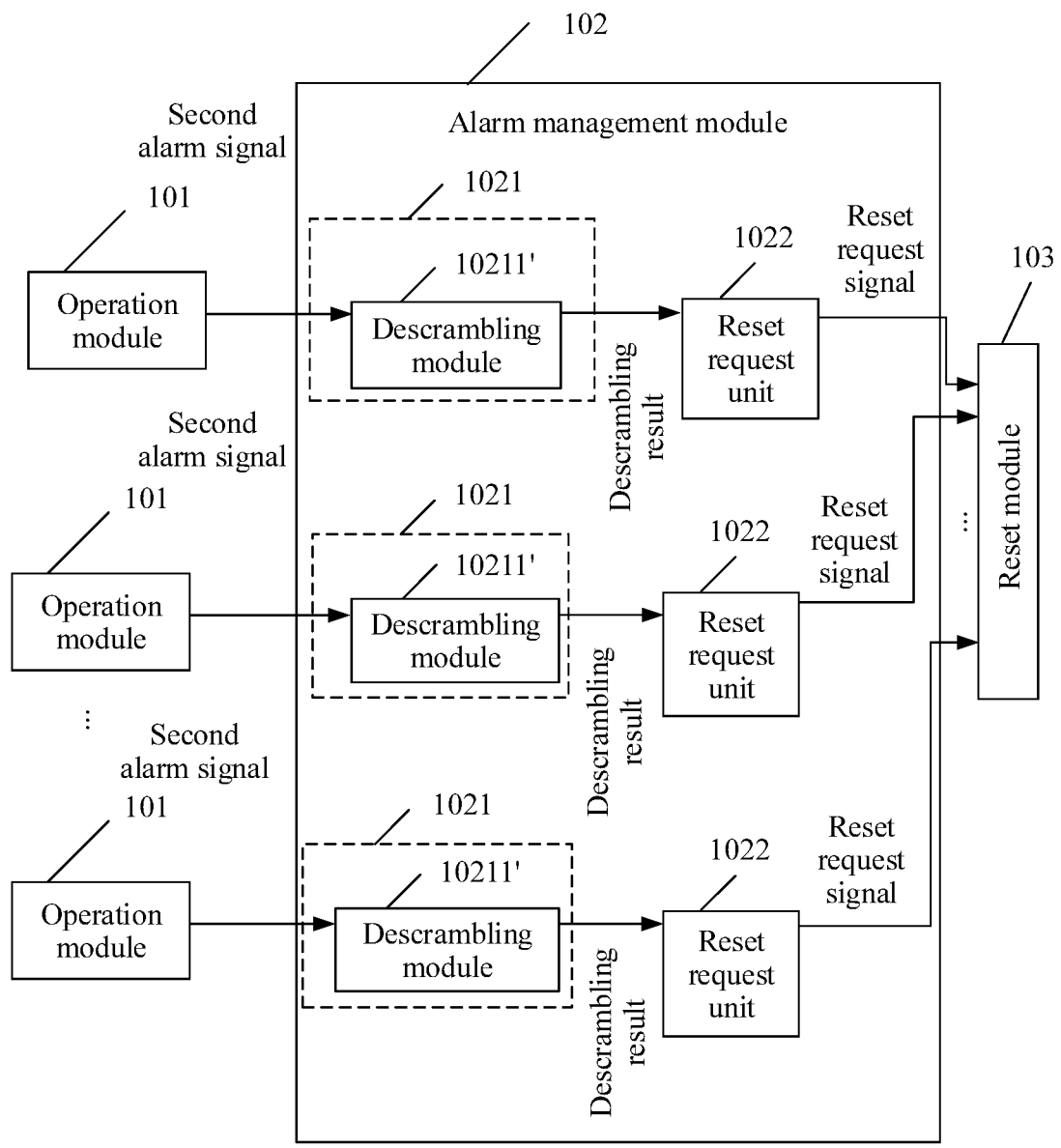
FIG. 4 is a schematic structural diagram of a data protection circuit of a chip according to Embodiment 4 of this application.

FIG. 4 is a schematic structural diagram of a data protection circuit of a chip according to Embodiment 4 of this application. FIG. 4 describes another possible implementation of the processing unit 1021 based on the embodiment shown in FIG. 1. As shown in FIG. 4, the processing unit 1021 includes a descrambling module 10211'. An input end of the descrambling module 10211' is connected to an output end of the operation module 101, an output end of the descrambling module 10211' is connected to an input end of the reset request unit 1022, and the descrambling module 10211' is configured to receive the second alarm signal, and perform descrambling processing on the second alarm signal, to obtain the descrambling result.

If descrambling performed by the descrambling module succeeds, the descrambling result is consistent with the first alarm signal, for example, if the first alarm signal is an active level, the descrambling result is an active level, or if the first alarm signal is an inactive level, the descrambling result is an inactive level. When descrambling performed by the descrambling module fails, the descrambling result is an active level, that is, that the descrambling performed by the descrambling module fails indicates that the second alarm signal is attacked. Therefore, when the descrambling fails, the descrambling result is an active level.

In this embodiment, when the operation module is attacked, the first alarm signal generated by the operation module is an active level, and the operation module sends the second alarm signal to the descrambling module. If descrambling succeeds, the descrambling result is consistent with the first alarm signal, that is, the descrambling result is an active level. If descrambling fails, it indicates that the second alarm signal is attacked, and the descrambling result is an active level. Therefore, when the first alarm signal is an active level, regardless of whether the first alarm signal is attacked, the descrambling result that is output by the descrambling module to the reset request unit is an active level such that the descrambling module can successfully transmit an alarm signal to the reset request unit. When the descrambling result received by the reset request unit is an active level, the generated reset request signal is an active level. When the received reset request signal is an active level, the reset module performs reset processing on the some or all operation modules of the chip. Therefore, data of the operation module is protected from being stolen, and chip security is improved.

Figure 5:
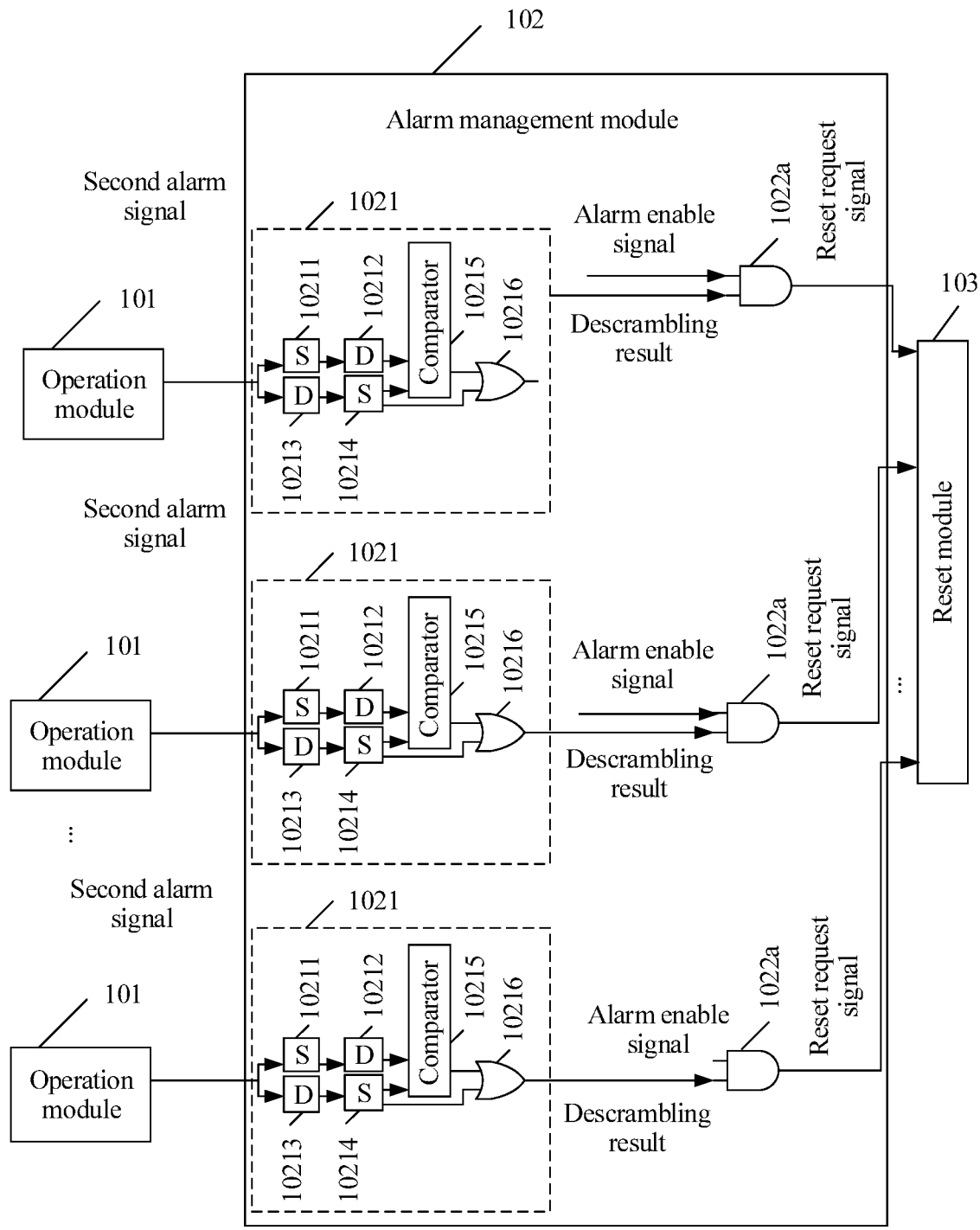
FIG. 5 is a schematic structural diagram of a data protection circuit of a chip according to Embodiment 5 of this application.

FIG. 5 is a schematic structural diagram of a data protection circuit of a chip according to Embodiment 5 of this application. Embodiment 5 is based on Embodiment 2 or Embodiment 3. Further, a possible implementation of the reset request unit 1022 is a first AND gate unit 1022a. A first input end of the first AND gate unit 1022a is connected to the output end of the first OR gate unit 10216, a second input end of the first AND gate unit 1022a is configured to input an alarm enable signal, and an output end of the first AND gate unit 1022a is configured to output the reset request signal.

When the alarm enable signal is an active level and the descrambling result that is output by the first OR gate unit is an active level, the reset request signal that is output by the output end of the first AND gate unit is an active level. In another case, the reset request signal that is output by the output end of the first AND gate unit is an inactive level.

Optionally, the alarm enable signal may be controlled by a one-time programmable device, or may be controlled by a register, and the register is controlled by software. When the alarm enable signal is controlled by the register, and the alarm enable signal is attacked, the alarm enable signal may be an active level by modifying the register.

In this embodiment, the reset request unit is implemented using the first AND gate unit. The alarm enable signal is used as input of the first AND gate unit. When both the alarm enable signal and the descrambling result are active levels, the reset request signal that is output by the output end of the first AND gate unit is an active level. In a scenario of testing a chip or another scenario in which reset of a chip is not allowed, the alarm enable signal may be set to an inactive signal in order to ensure normal use of a chip in the testing scenario or another scenario.

Figure 6A:
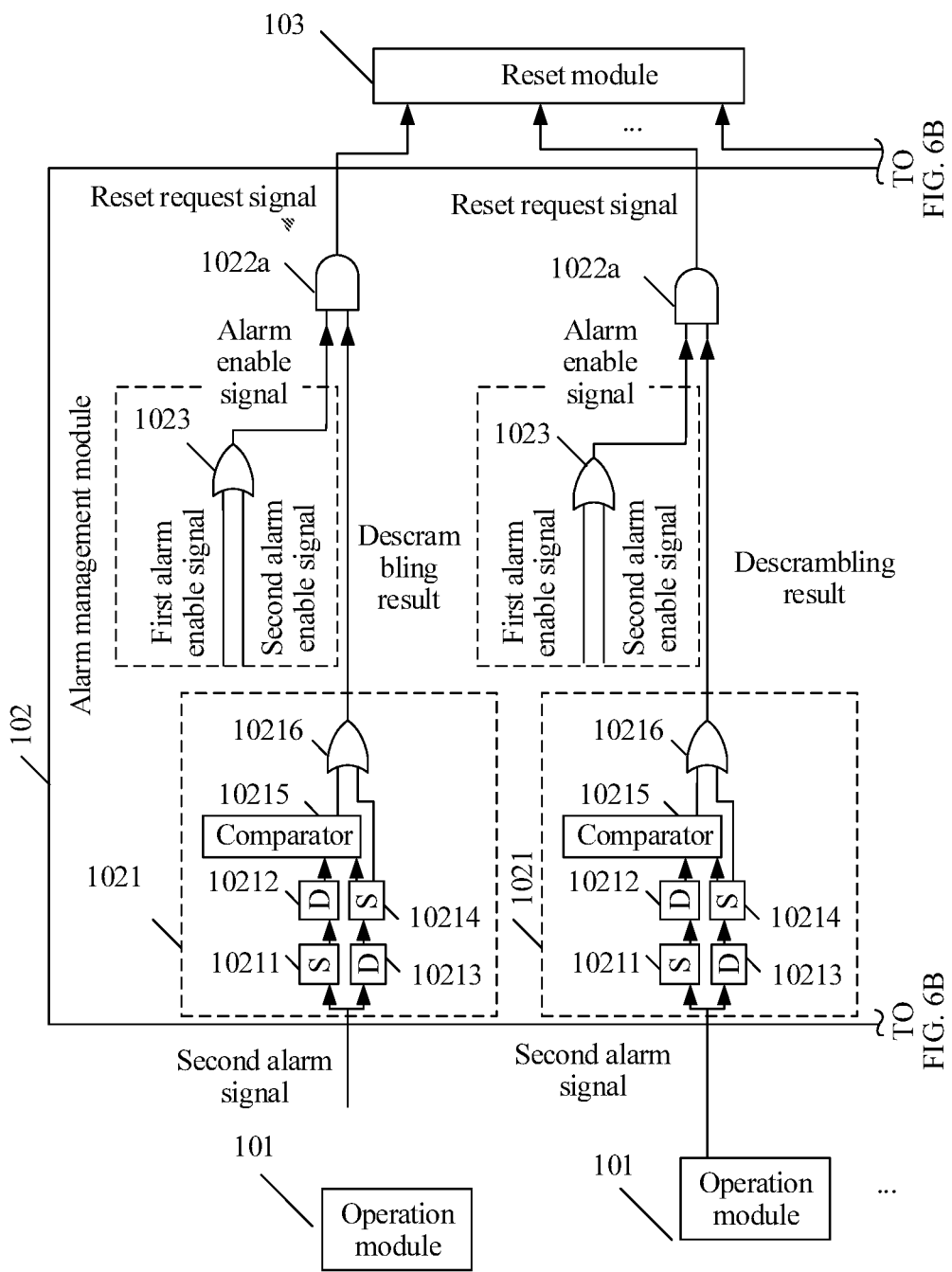
FIG. 6A and FIG. 6B are schematic structural diagrams of a data protection circuit of a chip according to Embodiment 6 of this application.
Figure 6B:
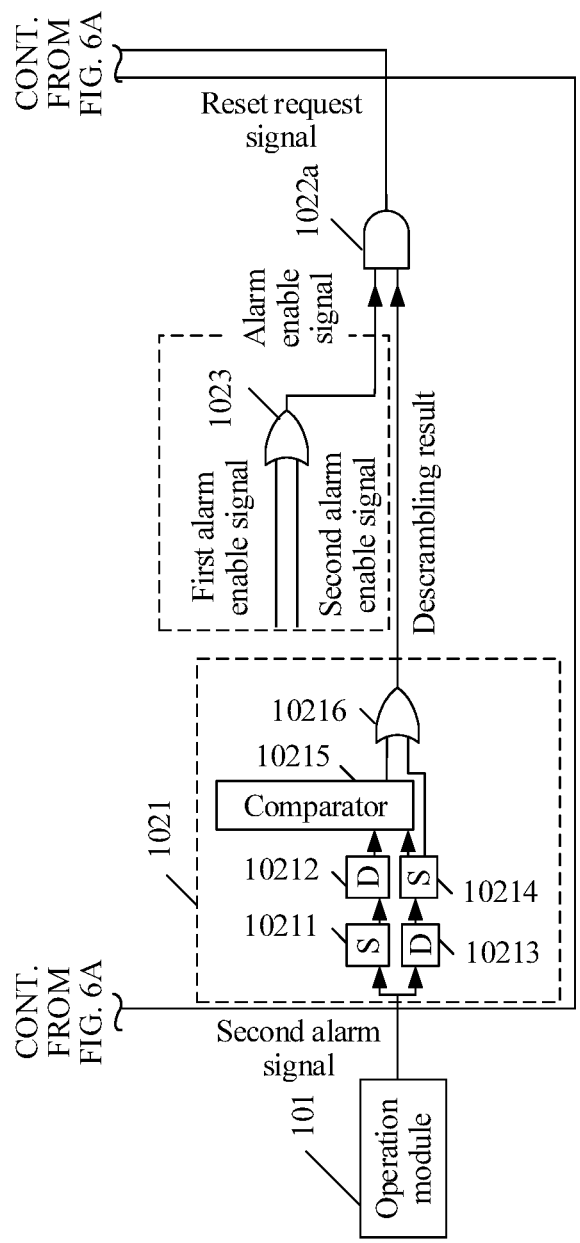

FIG. 6A and FIG. 6B are schematic structural diagrams of a data protection circuit of a chip according to Embodiment 6 of this application. Embodiment 6 is based on Embodiment 5, and further includes a second OR gate unit 1023. An output end of the second OR gate unit 1023 is configured to output the alarm enable signal, a first input end of the second OR gate unit 1023 is configured to input a first alarm enable signal, and a second input end of the second OR gate unit is configured to input a second alarm enable signal.

The first alarm enable signal is controlled by a one-time programmable device, such as an Efuse. The second alarm enable signal is controlled by a register, and the register is configured by software. Default values of the first alarm enable signal and the second alarm enable signal are active levels. The first alarm enable signal and the second alarm enable signal are mutually backed up using the second OR gate unit. When the first alarm enable signal is attacked, the second alarm enable signal may ensure that the alarm enable signal that is output by the second OR gate unit is an active level. When the second alarm enable signal is attacked, the first alarm enable signal may ensure that the alarm enable signal that is output by the second OR gate unit is an active level. In addition, because the second alarm enable signal is controlled by the register, and the register is configured by the software, when the second alarm enable signal is attacked, the second alarm enable signal may be an active level by modifying the register. Therefore, a problem that the reset request unit cannot generate a reset request signal of an active level because the alarm enable signal is an inactive level due to that the first alarm enable signal is attacked or the second alarm enable signal is attacked is avoided, and chip security is further improved.

Figure 7A:
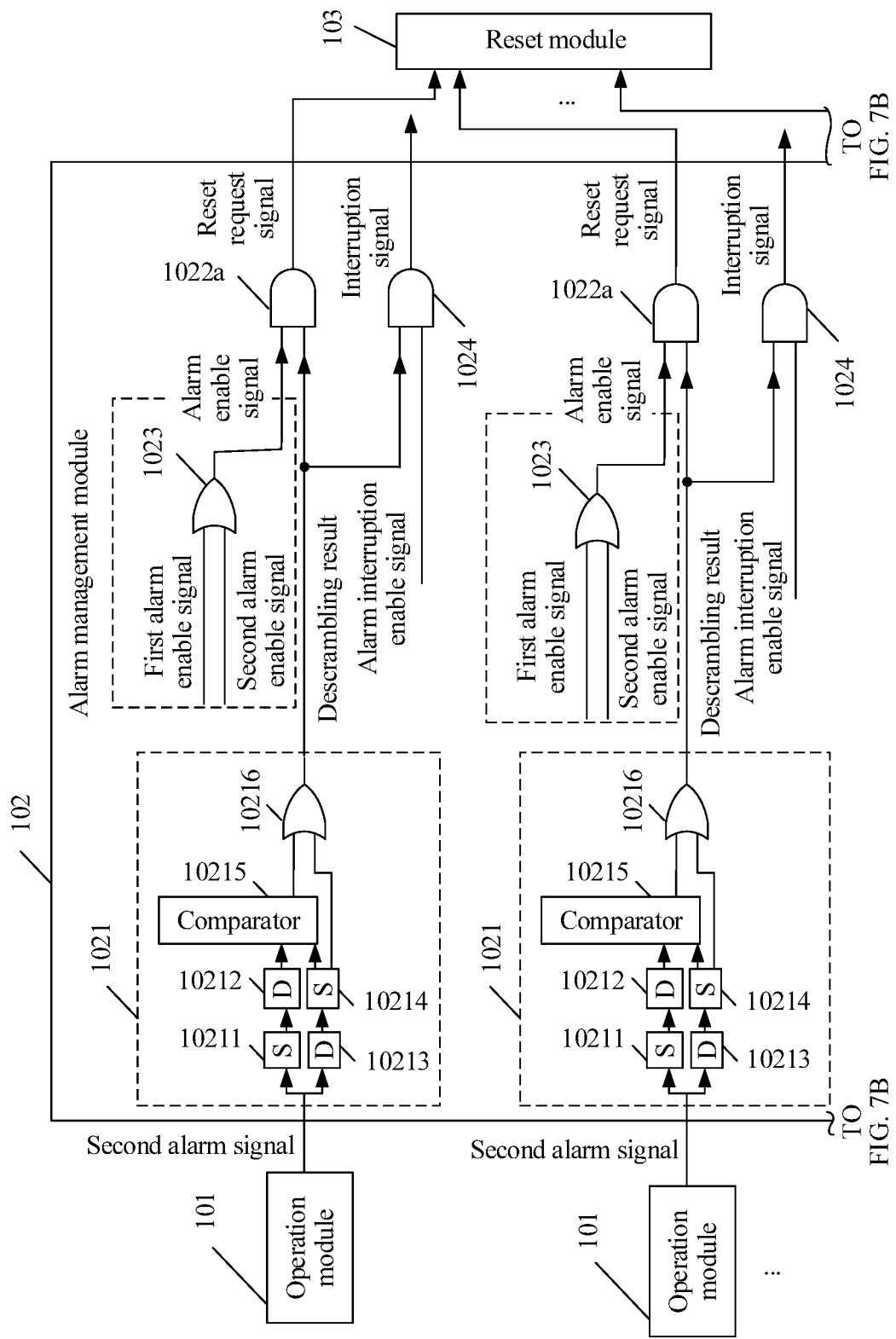
FIG. 7A and FIG. 7B are schematic structural diagrams of a data protection circuit of a chip according to Embodiment 7 of this application.
Figure 7B:
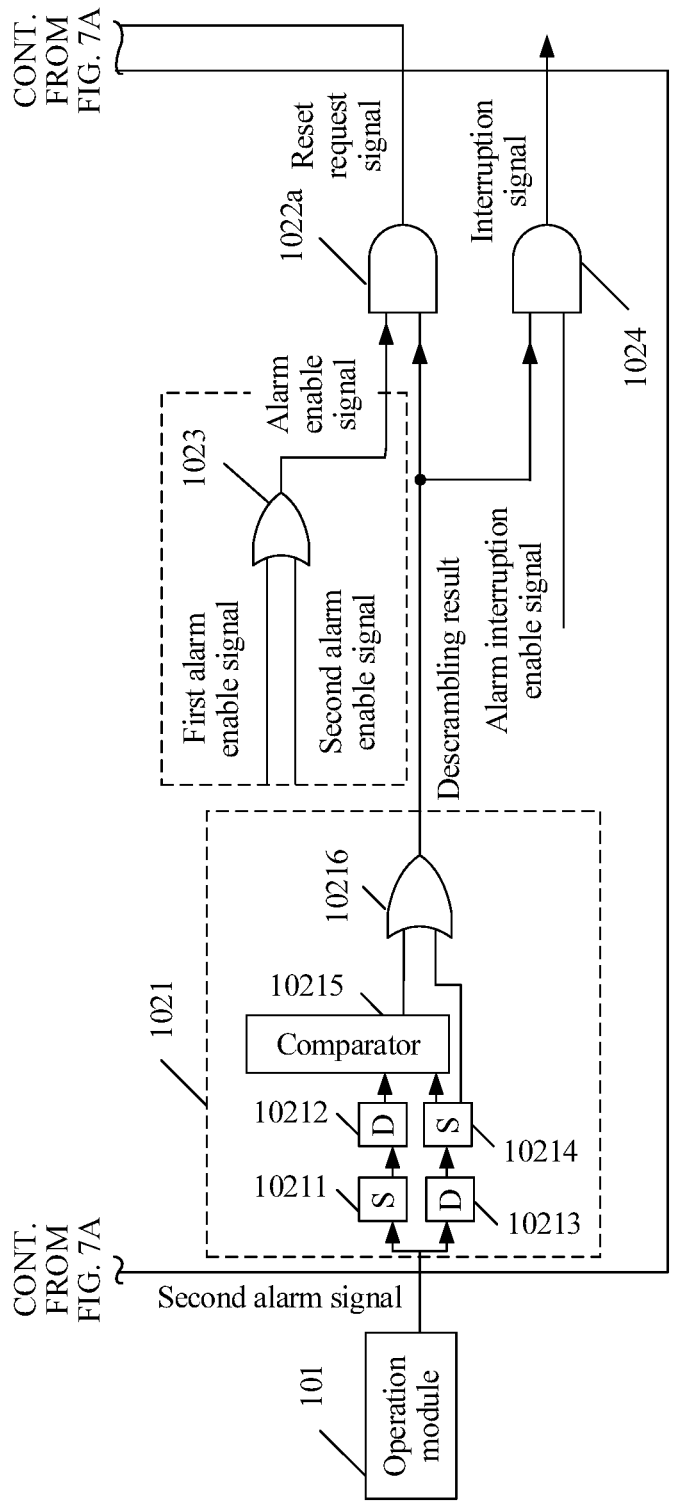

FIG. 7A and FIG. 7B are schematic structural diagrams of a data protection circuit of a chip according to Embodiment 7 of this application. Embodiment 7 is based on any one of Embodiments 2 to 5, and further includes a second AND gate unit 1024. A first input end of the second AND gate unit is configured to input an alarm interruption enable signal, a second input end of the second AND gate unit is connected to the output end of the first OR gate unit, an output end of the second AND gate unit is configured to input an interruption signal to a CPU, and the interruption signal is configured to trigger the CPU to execute an alarm processing program.

A default value of the alarm interruption enable signal is configured as an active level.

In this embodiment, the output end of the first OR gate unit outputs the descrambling result to the second input end of the second AND gate unit such that the output end of the second AND gate unit inputs the interruption signal to the CPU, to trigger the CPU to execute the alarm processing program. Therefore, a problem that the reset module cannot reset a chip because the reset request signal is attacked is avoided, and chip security is further improved.

In the embodiments, the reset module performs reset processing on the some or all operation modules of the chip. Further, the reset unit may reset all modules of the chip in a bit-OR manner, that is, if at least one reset request signal in the received reset request signals is an active level, all the modules of the chip are reset. The reset unit may further determine, according to a reset request signal of an active level, an operation module that is attacked, and reset only an attacked reset module, or an attacked reset module and an operation module related to the attacked reset module. For a specific reset manner, this application imposes no limitation.

This application further provides a chip, and the chip includes the data protection circuit shown in any one of Embodiments 1 to 7.

This application further provides an electronic device, and the electronic device includes the chip described in the foregoing embodiments.

What is claimed is:

1. A data protection circuit, comprising:
   an operation circuit configured to:
      generate a first alarm signal based on an attack signal, wherein the first alarm signal is in an active level when the operation circuit detects the attack signal, and wherein the first alarm signal is in an inactive level when the operation circuit does not detect the attack signal;
      perform bit width expansion and scrambling processing on the first alarm signal to obtain a second alarm signal; and
      output the second alarm signal;
   an alarm management circuit coupled to the operation circuit, wherein the alarm management circuit comprises:
      a processing circuit comprising two signal processing paths, wherein the processing circuit is configured to:
         receive the second alarm signal on each of the two signal processing paths;
         perform descrambling processing of the second alarm signal on each of the two signal processing paths at different time points to obtain a descrambling result, wherein the descrambling result is in a second active level when the first alarm signal is in the active level, and wherein the descrambling result is in a second inactive level when the first alarm signal is in the inactive level; and
         output the descrambling result;
      a reset request circuit coupled to the processing circuit and configured to:
         receive the descrambling result;
         generate a reset request signal according to the descrambling result; and
         output the reset request signal, wherein the reset request signal is in:
            the active level when the descrambling result is in the active level; and
            the inactive level when the descrambling result is in the inactive level; and
      a reset circuit coupled to the alarm management circuit and configured to:

receive the reset request signal; and determine, according to the reset request signal, whether to reset the operation circuit.

2. The data protection circuit of claim 1, wherein the processing circuit comprises:

a first OR gate circuit;

a comparator coupled to the first OR gate circuit;

a first descrambling processing circuit, wherein an input end of the first descrambling processing circuit is coupled to an output end of the operation circuit and is configured to receive the second alarm signal;

a first delay processing circuit coupled to the first descrambling processing circuit, wherein an output end of the first descrambling processing circuit is coupled to an input end of the first delay processing circuit, and wherein an output end of the first delay processing circuit is coupled to a first input end of the comparator;

a second delay processing circuit, wherein an input end of the second delay processing circuit is coupled to the output end of the operation circuit; and a second descrambling processing circuit coupled to the second delay processing circuit, wherein an output end of the second descrambling processing circuit is coupled to a second input end of the comparator, wherein an output end of the second delay processing circuit is coupled to an input end of the second descrambling processing circuit, wherein the output end of the second descrambling processing circuit is coupled to a first input end of the first OR gate circuit, wherein an output end of the comparator is coupled to a second input end of the first OR gate circuit, wherein an output end of the first OR gate circuit is configured to output the descrambling result, wherein the first descrambling processing circuit and the second descrambling processing circuit are configured to perform the descrambling processing, wherein the first delay processing circuit and the second delay processing circuit are configured to perform delay processing, and wherein when the descrambling processing performed by the first descrambling processing circuit succeeds, the output end of the first descrambling processing circuit is configured to:

output the active level when the first alarm signal is in the active level; and output the inactive level when the first alarm signal is in the inactive level, wherein the output end of the first descrambling processing circuit is configured to output the active level when the descrambling processing performed by the first descrambling processing circuit fails, wherein when the descrambling processing performed by the second descrambling processing circuit succeeds, the output end of the second descrambling processing circuit is configured to:

output the active level when the first alarm signal is in the active level; and output the inactive level when the first alarm signal is in the inactive level, and wherein the output end of the second descrambling processing circuit is configured to output the active level when the descrambling processing performed by the second descrambling processing circuit fails.

3. The data protection circuit of claim 1, wherein the processing circuit comprises:

a first OR gate circuit;

a comparator coupled to the first OR gate circuit;

a first descrambling processing circuit, wherein an input end of the first descrambling processing circuit is coupled to an output end of the operation circuit;

a first delay processing circuit coupled to the first descrambling processing circuit, wherein an output end of the first descrambling processing circuit is coupled to an input end of the first delay processing circuit, wherein an output end of the first delay processing circuit is coupled to a first input end of the comparator, and wherein the output end of the first delay processing circuit is coupled to a first input end of the first OR gate circuit;

a second delay processing circuit, wherein an input end of the second delay processing circuit is coupled to the output end of the operation circuit; and a second descrambling processing circuit coupled to the second delay processing circuit, wherein an output end of the second delay processing circuit is coupled to an input end of the second descrambling processing circuit, wherein an output end of the second descrambling processing circuit is coupled to a second input end of the comparator, wherein an output end of the comparator is coupled to a second input end of the first OR gate circuit, wherein an output end of the first OR gate circuit is configured to output the descrambling result, wherein the first descrambling processing circuit and the second descrambling processing circuit are configured to perform the descrambling processing, wherein the first delay processing circuit and the second delay processing circuit are configured to perform delay processing, and wherein when the descrambling processing performed by the first descrambling processing circuit succeeds, the output end of the first descrambling processing circuit is configured to:

output the active level when the first alarm signal is in the active level; and output the inactive level when the first alarm signal is in the inactive level, wherein the output end of the first descrambling processing circuit is configured to output the active level when the descrambling processing performed by the first descrambling processing circuit fails, wherein when the descrambling processing performed by the second descrambling processing circuit succeeds, the output end of the second descrambling processing circuit is configured to:

output the active level when the first alarm signal is in the active level; and output the inactive level when the first alarm signal is in the inactive level, and wherein the output end of the second descrambling processing circuit is configured to output the active level when the descrambling processing performed by the second descrambling processing circuit fails.

4. The data protection circuit of claim 1, wherein the processing circuit comprises a descrambling circuit, wherein an input end of the descrambling circuit is coupled to an output end of the operation circuit, wherein an output end of the descrambling circuit is coupled to an input end of the reset request circuit, and wherein the descrambling circuit is configured to:

receive the second alarm signal;

perform the descrambling processing on the second alarm signal; and obtain the descrambling result, wherein when the descrambling processing performed by the descrambling circuit succeeds, the descrambling result is in:

the active level when the first alarm signal is in the active level; and the inactive level when the first alarm signal is in the inactive level, and wherein the descrambling result is in the active level when the descrambling processing performed by the descrambling circuit fails.

5. The data protection circuit of claim 2, wherein the reset request circuit is a first AND gate circuit, wherein a first input end of the first AND gate circuit is coupled to the output end of the first OR gate circuit, wherein a second input end of the first AND gate circuit is configured to input an alarm enable signal, and wherein an output end of the first AND gate circuit is configured to output the reset request signal.

6. The data protection circuit of claim 5, wherein the alarm enable signal is received from a register, and wherein the register is configured by a software.

7. The data protection circuit of claim 5, further comprising a second OR gate circuit, wherein an output end of the second OR gate circuit is configured to output the alarm enable signal, wherein a first input end of the second OR gate circuit is configured to input a first alarm enable signal, wherein a second input end of the second OR gate circuit is configured to input a second alarm enable signal, wherein the first alarm enable signal is received from a one-time programmable device, wherein the second alarm enable signal is received from a register, and wherein the register is configured by a software.

8. The data protection circuit of claim 5, further comprising a second AND gate circuit, wherein a first input end of the second AND gate circuit is configured to input an alarm interruption enable signal, wherein a second input end of the second AND gate circuit is coupled to the output end of the first OR gate circuit, wherein an output end of the second AND gate circuit is configured to input an interruption signal to a central processing unit (CPU), and wherein the interruption signal is configured to trigger the CPU to execute an alarm processing program.

9. The data protection circuit of claim 1, wherein a scrambling processing manner comprises any one of:

cyclic redundancy check (CRC);

parity check; or encryption.

10. The data protection circuit of claim 7, wherein the one-time programmable device is an electrical fuse (Efuse).

11. The data protection circuit of claim 1, wherein the active level is a high level signal value, and wherein the inactive level is a low level signal value.

12. A method for data protection implemented by a data protection circuit, wherein the method comprises:

generating a first alarm signal based on an attack signal, wherein the first alarm signal is in an active level based on detecting the attack signal, and wherein the first alarm signal is in an inactive level based on the attack signal not being detected;

performing bit width expansion and scrambling processing on the first alarm signal to obtain a second alarm signal;

performing descrambling processing of the second alarm signal on each of two signal processing paths at different time points to obtain a descrambling result, wherein the descrambling result is in a second active level when the first alarm signal is in the active level, and wherein the descrambling result is in a second inactive level when the first alarm signal is in the inactive level;

outputting the descrambling result, wherein based on the descrambling processing being successful, the descrambling result is in:

the active level when the first alarm signal is in the active level; and the inactive level when the first alarm signal is in the inactive level, wherein the descrambling result is in the active level based on the descrambling processing failing;

generating a reset request signal according to the descrambling result;

outputting the reset request signal, wherein the reset request signal is in:

the active level based on the descrambling result being in the active level; and the inactive level based on the descrambling result being in the inactive level; and determining, according to the reset request signal, whether to reset some or all operation circuits.

13. The method of claim 12, further comprising:

outputting the active level based on the first alarm signal being in the active level and the descrambling processing failing; and outputting the inactive level based on the first alarm signal being in the inactive level.

14. The method of claim 12, further comprising:

obtaining the second alarm signal;

performing the descrambling processing on the second alarm signal; and obtaining the descrambling result, wherein based on the descrambling processing being successful, the descrambling result is in:

the active level when the first alarm signal is in the active level; and the inactive level when the first alarm signal is in the inactive level, and wherein the descrambling result is in the active level based on the descrambling processing failing.

15. The method of claim 14, further comprising:

inputting an interruption signal; and triggering a processor to execute an alarm processing program responsive to receiving the interruption signal.

16. The method of claim 12, further comprising performing the scrambling processing based on a cyclic redundancy check (CRC).

17. The method of claim 12, further comprising performing the scrambling processing based on a parity check.

18. The method of claim 12, further comprising performing the scrambling processing based on encryption.

19. The method of claim 12, further comprising:

inputting an alarm enable signal; and outputting the reset request signal based on the alarm enable signal.

20. The method of claim 12, further comprising:

outputting the active level based on the first alarm signal being in the active level and the descrambling processing succeeding; and outputting the inactive level based on the first alarm signal being in the inactive level.

* * * * *